US012562804B2

(12) United States Patent
Zhang et al.

(10) Patent No.: US 12,562,804 B2
(45) Date of Patent: Feb. 24, 2026

(54) APPARATUS AND METHODS OF NEW BEAM IDENTIFICATION FOR LINK RECOVERY FOR ENHANCED PDCCH WITH MULTIPLE TRANSMISSIONS

(71) Applicant: LENOVO (BEIJING) LIMITED, Beijing (CN)

(72) Inventors: Yi Zhang, Beijing (CN); Chenxi Zhu, Fairfax, VA (US); Bingchao Liu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 463 days.

(21) Appl. No.: 18/018,933

(22) PCT Filed: Jul. 31, 2020

(86) PCT No.: PCT/CN2020/106109
§ 371 (c)(1),
(2) Date: Jan. 31, 2023

(87) PCT Pub. No.: WO2022/021284
PCT Pub. Date: Feb. 3, 2022

(65) Prior Publication Data
US 2023/0284197 A1     Sep. 7, 2023

(51) Int. Cl.
*H04W 72/044* (2023.01)
*H04B 7/06* (2006.01)
(Continued)

(52) U.S. Cl.
CPC ....... *H04B 7/06964* (2023.05); *H04L 5/0048* (2013.01); *H04W 72/046* (2013.01); *H04W 72/231* (2023.01); *H04W 76/19* (2018.02)

(58) Field of Classification Search
CPC . H04W 72/046; H04W 76/19; H04W 72/231; H04W 16/28; H04W 36/0033;
(Continued)

(56) References Cited

U.S. PATENT DOCUMENTS

| 2019/0098520 A1* | 3/2019 | Kim ...................... H04W 76/27 |
| 2021/0135713 A1* | 5/2021 | Kang .................. H04W 72/046 |

(Continued)

FOREIGN PATENT DOCUMENTS

| CN | 110771055 A | 2/2020 |
| CN | 110831237 A | 2/2020 |

(Continued)

OTHER PUBLICATIONS

International Searching Authority, "Written Opinion of the International Searching Authority," PCT/CN2020/106109, Apr. 9, 2021, pp. 1-3.

*Primary Examiner* — Mewale A Ambaye
(74) *Attorney, Agent, or Firm* — Kunzler Needham & Hilton

(57) ABSTRACT

Apparatus and methods of new beam identification for link recovery for enhanced Physical Downlink Control Channel (PDCCH) with multiple transmissions are disclosed. The apparatus includes: a receiver that receives configurations indicating a plurality of beam identification resources for identifying a plurality of candidate beams for link recovery; a processor that controls the receiver to monitor the beam identification resources and identifies one or more recovery beams from the candidate beams, upon detection of beam failure; a transmitter that transmits information indicating the recovery beams; wherein the processor further controls the receiver to monitor PDCCH transmitted with the recovery beams.

20 Claims, 7 Drawing Sheets

(51) Int. Cl.
    H04L 5/00         (2006.01)
    H04W 72/231     (2023.01)
    H04W 76/19      (2018.01)

(58) Field of Classification Search
    CPC ............... H04W 56/001; H04W 74/08; H04W
                74/0833; H04L 5/0048; H04B 7/0695
    See application file for complete search history.

(56)              References Cited

U.S. PATENT DOCUMENTS

| | | | |
|---|---|---|---|
| 2022/0264475 A1* | 8/2022 | Yi ......................... | H04W 52/42 |
| 2022/0360314 A1* | 11/2022 | Zhu ....................... | H04W 72/02 |
| 2023/0146347 A1* | 5/2023 | Zhou ................. | H04W 74/0841 |
| | | | 370/329 |
| 2023/0209375 A1* | 6/2023 | Zhang ................. | H04B 7/0417 |
| | | | 370/242 |
| 2024/0291547 A1* | 8/2024 | Matsumura ............ | H04B 7/088 |

FOREIGN PATENT DOCUMENTS

| | | | | |
|---|---|---|---|---|
| CN | 111345090 A | 6/2020 | | |
| EP | 3996314 A1 * | 5/2022 | .......... | H04W 72/569 |
| WO | WO-2019119399 A1 * | 6/2019 | .......... | H04L 5/0053 |

* cited by examiner

100

104

104

102

104a backhaul backhaul

| $C_7$ | $C_6$ | $C_5$ | $C_4$ | $C_3$ | $C_2$ | $C_1$ | R |
|---|---|---|---|---|---|---|---|
| AC | R | Candidate RS ID in RS list 1 or R bits | | | | | 612a |
| R | R | Candidate RS ID in RS list 2 or R bits | | | | | 612b |

. . .

| AC | R | Candidate RS ID in RS list 1 or R bits | | | | | 614a |
|---|---|---|---|---|---|---|---|
| R | R | Candidate RS ID in RS list 2 or R bits | | | | | 614b |

Figure 6A

| $C_7$ | $C_6$ | $C_5$ | $C_4$ | $C_3$ | $C_2$ | $C_1$ | R |
|---|---|---|---|---|---|---|---|
| AC | R | Candidate RS Combination ID or R bits | | | | | 622 |

. . .

| AC | R | Candidate RS Combination ID or R bits | | | | | 624 |
|---|---|---|---|---|---|---|---|

Figure 6B

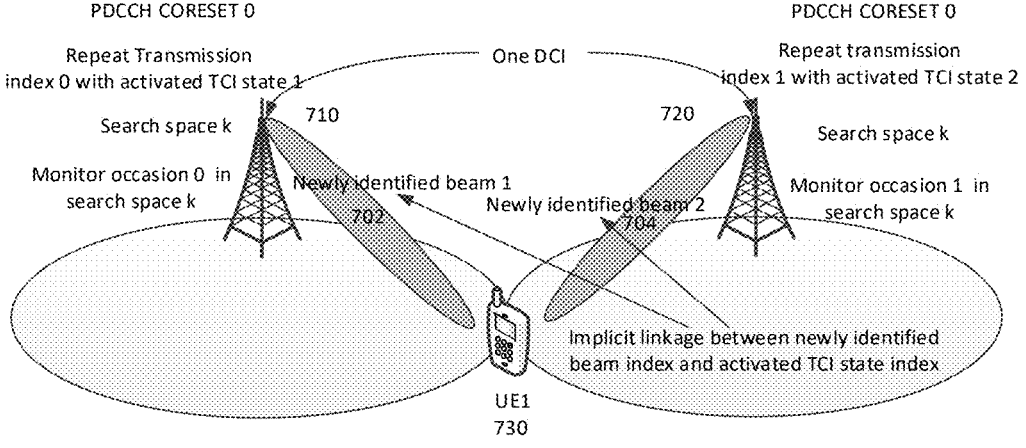

PDCCH CORESET 0

Repeat Transmission
index 0 with activated TCI state 1

Search space k

Monitor occasion 0 in
search space k

One DCI

710

720

Newly identified beam 1

Newly identified beam 2

702

704

PDCCH CORESET 0

Repeat transmission
index 1 with activated TCI state 2

Search space k

Monitor occasion 1 in
search space k

Implicit linkage between newly identified
beam index and activated TCI state index

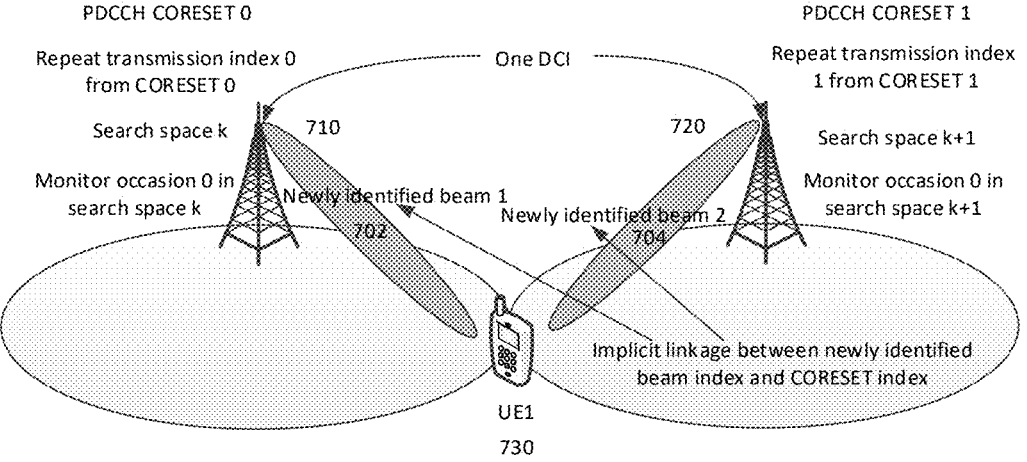

PDCCH CORESET 0

Repeat transmission index 0
from CORESET 0

Search space k

Monitor occasion 0 in
search space k

One DCI

710

720

Newly identified beam 1

Newly identified beam 2

702

704

PDCCH CORESET 1

Repeat transmission index
1 from CORESET 1

Search space k+1

Monitor occasion 0 in
search space k+1

Implicit linkage between newly identified
beam index and CORESET index

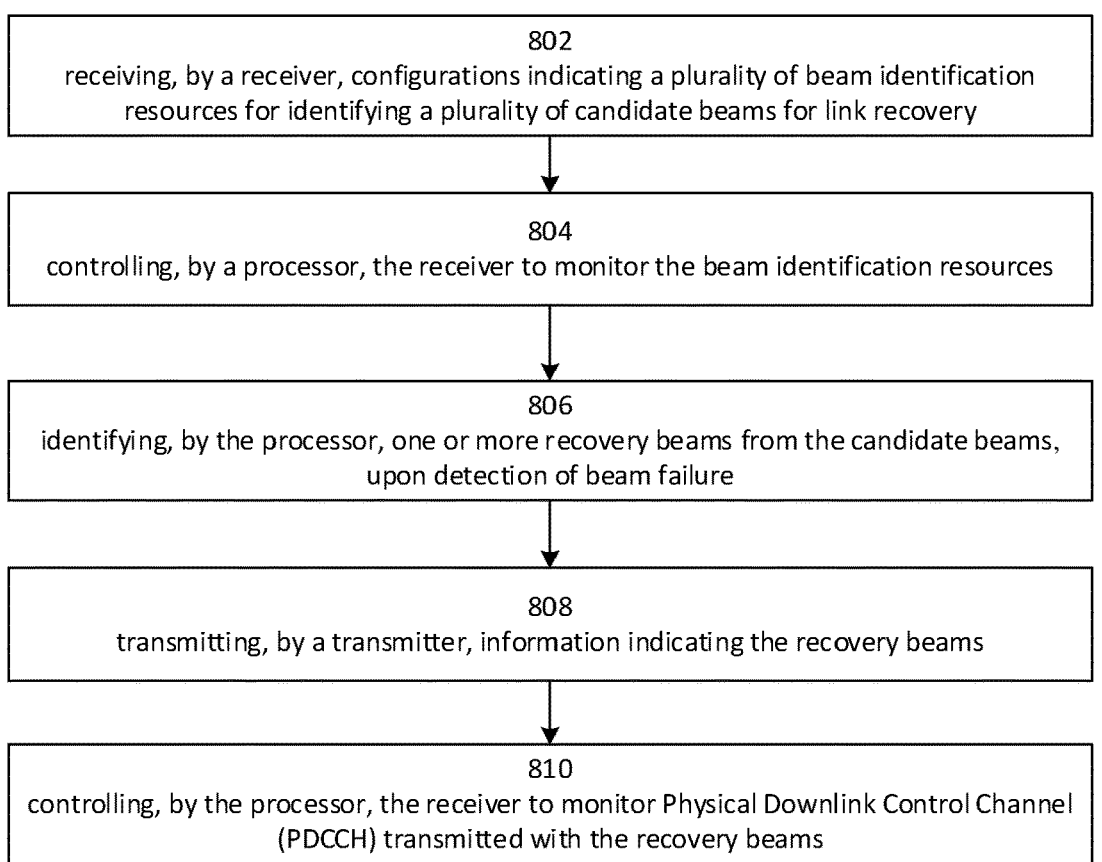

802
receiving, by a receiver, configurations indicating a plurality of beam identification resources for identifying a plurality of candidate beams for link recovery

804
controlling, by a processor, the receiver to monitor the beam identification resources

806
identifying, by the processor, one or more recovery beams from the candidate beams, upon detection of beam failure

808
transmitting, by a transmitter, information indicating the recovery beams

810
controlling, by the processor, the receiver to monitor Physical Downlink Control Channel (PDCCH) transmitted with the recovery beams

Figure 8

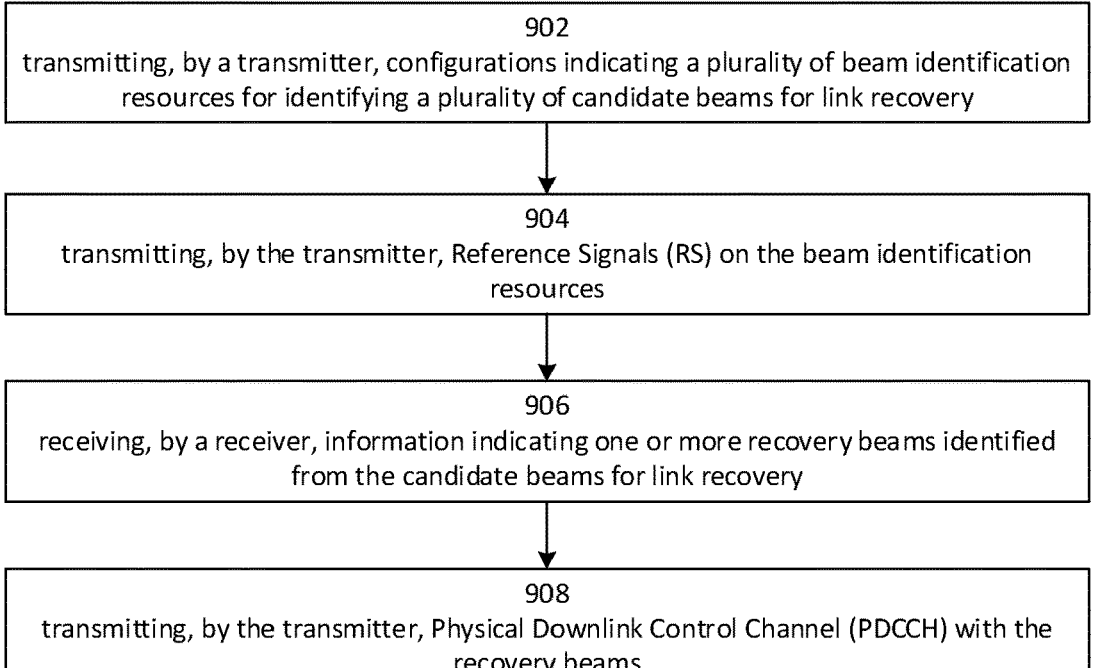

902
transmitting, by a transmitter, configurations indicating a plurality of beam identification resources for identifying a plurality of candidate beams for link recovery

904
transmitting, by the transmitter, Reference Signals (RS) on the beam identification resources

906
receiving, by a receiver, information indicating one or more recovery beams identified from the candidate beams for link recovery

908
transmitting, by the transmitter, Physical Downlink Control Channel (PDCCH) with the recovery beams

Figure 9

APPARATUS AND METHODS OF NEW BEAM IDENTIFICATION FOR LINK RECOVERY FOR ENHANCED PDCCH WITH MULTIPLE TRANSMISSIONS

FIELD

The subject matter disclosed herein relates generally to wireless communication and more particularly relates to, but not limited to, apparatus and methods of new beam identification for link recovery for enhanced Physical Downlink Control Channel (PDCCH) with multiple transmissions.

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Uplink Control Channel (PUCCH), Physical Random Access Channel (PRACH), Physical Broadcast Channel (PBCH), Random Access Channel (RACH), Bandwidth Part (BWP), Control Element (CE), Control Resource Set (CORESET), Cyclic redundancy check (CRC), Channel State Information (CSI), Channel State Information Reference Signal (CSI-RS), Downlink Control Information (DCI), Frequency Division Multiple Access (FDMA), Identification (ID), Information Element (IE), Logical Channel ID, or Logical Channel Index (LCID), Media Access Control (MAC), Modulation Coding Scheme (MCS), Primary Cell (PCell), Random Access Response (RAR), Random Access Radio Network Temporary Identifier (RA-RNTI), Radio Network Temporary Identifier (RNTI), Radio Resource Control (RRC), Reference Signal (RS), Reference Signal Received Power (RSRP), Secondary Cell (SCell), Scheduling Request (SR), Synchronization Signal Block (SSB), Transmit Receive Point (TRP), Component Carrier (CC), Cell Radio Network Temporary Identifier (C-RNTI), Frequency Range 1 (FR1), Frequency Range 2 (FR2), Layer 1 Reference Signal Received Power (L1-RSRP), Synchronization Signal (SS), Supplementary Uplink (SUL), Transmission Configuration Indication (TCI), Technical Specification (TS), Beam Failure Recovery (BFR), Beam Failure Recovery Request (BFRQ), Primary Secondary Cell (PS-Cell), Beam Failure Detection (BFD), Normal Uplink (NUL).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (E-PDCCH) allows exploitation of the additional resources to improve PDCCH transmission reliability and robustness. Multiple transmissions of the E-PDCCH may be transmitted from a same TRP or some different TRPs.

SUMMARY

Apparatus and methods of new beam identification for link recovery for enhanced PDCCH with multiple transmissions are disclosed.

According to a first aspect, there is provided an apparatus, including: a receiver that receives configurations indicating a plurality of beam identification resources for identifying a plurality of candidate beams for link recovery; a processor that controls the receiver to monitor the beam identification resources and identifies one or more recovery beams from the candidate beams, upon detection of beam failure; a transmitter that transmits information indicating the recovery beams; wherein the processor further controls the receiver to monitor Physical Downlink Control Channel (PDCCH) transmitted with the recovery beams.

According to a second aspect, there is provided an apparatus, including: a transmitter that transmits configurations indicating a plurality of beam identification resources for identifying a plurality of candidate beams for link recovery, and further transmits Reference Signals (RS) on the beam identification resources; and a receiver that receives information indicating one or more recovery beams identified from the candidate beams for link recovery; wherein the transmitter further transmits Physical Downlink Control Channel (PDCCH) with the recovery beams.

According to a third aspect, there is provided a method, including: receiving, by a receiver, configurations indicating a plurality of beam identification resources for identifying a plurality of candidate beams for link recovery; controlling, by a processor, the receiver to monitor the beam identification resources; identifying, by the processor, one or more recovery beams from the candidate beams, upon detection of beam failure; transmitting, by a transmitter, information indicating the recovery beams; controlling, by the processor, the receiver to monitor Physical Downlink Control Channel (PDCCH) transmitted with the recovery beams.

According to a fourth aspect, there is provided a method, including: transmitting, by a transmitter, configurations indicating a plurality of beam identification resources for identifying a plurality of candidate beams for link recovery; transmitting, by the transmitter, Reference Signals (RS) on the beam identification resources; receiving, by a receiver, information indicating one or more recovery beams identified from the candidate beams for link recovery; and transmitting, by the transmitter, Physical Downlink Control Channel (PDCCH) with the recovery beams.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 6A is a schematic diagram illustrating an example of MAC CE enhancement with additional candidate RS IDs for new beams in additional RS list in accordance with some implementations of the present disclosure;

FIG. 6B is a schematic diagram illustrating an example of MAC CE enhancement with candidate RS combination IDs for candidate beam combinations in accordance with some implementations of the present disclosure;

FIG. 7A is a schematic diagram of an example illustrating a linkage relation between identified new beams and Transmission Configuration Indication (TCI) state for each PDCCH transmission in case of single Control Resource Set (CORESET) with multiple activated TCI states in accordance with some implementations of the present disclosure;

FIG. 7B is a schematic diagram of an example illustrating a linkage relation between identified new beams and TCI state for each PDCCH transmission in case of multiple CORESETs with one activate TCI state for one CORESET in accordance with some implementations of the present disclosure;

FIG. 8 is a flow chart illustrating steps of new beam identification for link recovery for enhanced PDCCH with multiple transmissions by UE in accordance with some implementations of the present disclosure; and FIG. 9 is a flow chart illustrating steps of new beam identification for link recovery for enhanced PDCCH with multiple transmissions by NE in accordance with some implementations of the present disclosure.

DETAILED DESCRIPTION

Figure 1:
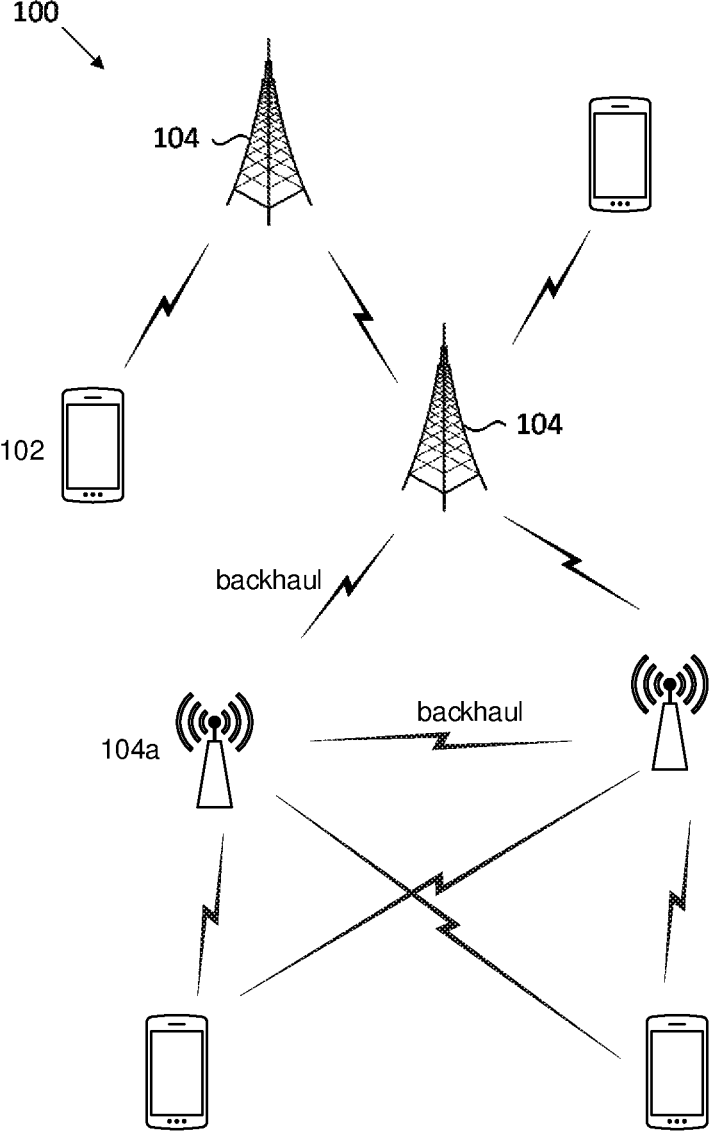
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
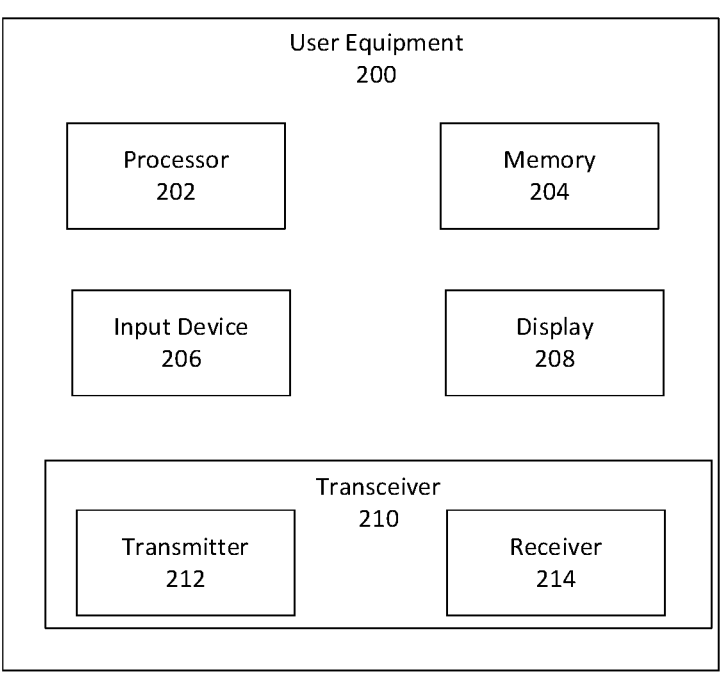
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
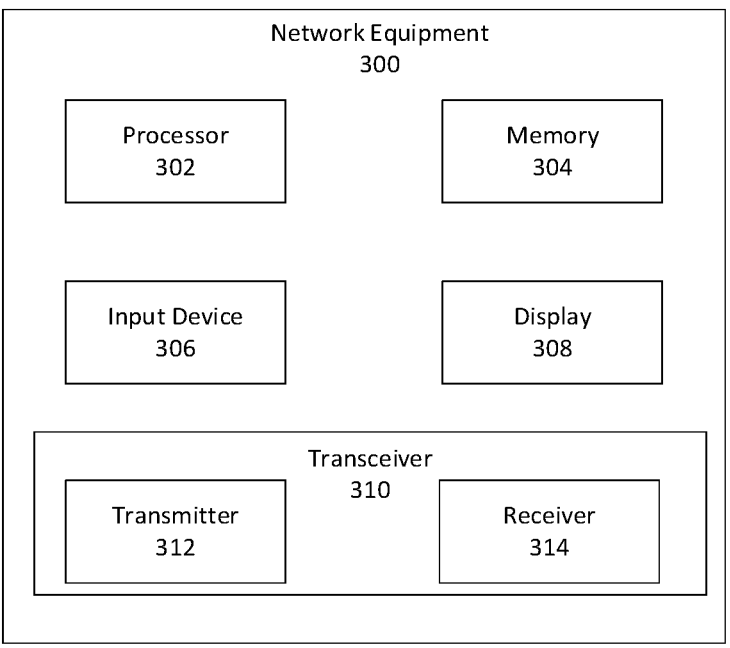
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

With multiple TRPs, PDCCH for one Downlink Control Information (DCI) may be transmitted multiple times with different time, frequency, and/or spatial resources. Based on the principle for link recovery mechanism in Release 15, a new beam is selected from a new beam candidate resource set or list with its Layer 1 Reference Signal Received Power (L1-RSRP) above a configured threshold when beam failure is triggered. Then, the newly identified beam is used for later PDCCH transmission during link recovery. With enhanced PDCCH transmission from multiple TRPs, the link quality for control channel will be improved by multiple transmission and/or multiple beams. Thus, multiple new beams may be identified and used for later PDCCH transmission to improve transmission reliability when beam failure is triggered.

For beam failure detection in Release 15 or Release 16, only a single beam is identified for link recovery. For PDCCH with multiple transmissions from multiple TRPs (i.e., in Release 17), multiple beams may be identified and reported. That is, new beam identification resources may be defined and multiple identified beams may be reported.

The scheme for multiple PDCCH transmissions and related monitoring behaviour should be designed based on the multiple newly identified beams. In detail, it includes the linkage relation between multiple identified beams and TCI states for PDCCH transmissions/monitoring, starting time of PDCCH monitoring window for Random Access Response (RAR) and Random Access Radio Network Temporary Identifier (RA-RNTI) value for Cyclic Redundancy Check (CRC) scrambling for PDCCH.

A UE can be provided, for each Bandwidth Part (BWP) of a serving cell, a set $\bar{q}_1$ of periodic Channel State Information Reference Signal (CSI-RS) resource configuration indexes and/or Synchronization Signal/Physical Broadcast Channel (SS/PBCH) block indexes by candidateBeamRSList or candidateBeamResourceList for radio link quality measurements on the BWP of the serving cell. That is, the UE may receive configurations indicating a plurality of beam identification resources (i.e. the set $\bar{q}_1$) for identifying a plurality of candidate beams for link recovery.

The threshold $Q_{in,LR}$ corresponds to the value provided by rsrp-ThresholdSSB or rsrp-ThresholdSSBBFR. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS. Upon request from higher layers, the UE provides to higher layers the periodic CSI-RS configuration indexes and/or SS/PBCH block indexes from the set $\bar{q}_1$ and the corresponding L1-RSRP measurements that are larger than or equal to the $Q_{in,LR}$ threshold.

The Information Element (IE) BeamFailureRecoveryConfig is used to configure the UE with Random Access Channel (RACH) resources and candidate beams for beam failure recovery. The detailed information on Radio Resource Control (RRC) signalling for BeamFailureRecoveryConfig is shown as follows.

| BeamFailureRecoveryConfig information element | |
|---|---|
| BeamFailureRecoveryConfig ::= | SEQUENCE { |
| root SequenceIndex-BFR | INTEGER (0..137) |
| OPTIONAL, -- Need M | |
| rach-ConfigBFR | RACH-ConfigGeneric |
| OPTIONAL, -- Need M | |
| rsrp-ThresholdSSB | RSRP-Range |
| OPTIONAL, -- Need M | |
| candidateBeamRSList | SEQUENCE (SIZE(1..maxNrofCandidateBeams)) OF |
| PRACH-ResourceDedicatedBFR | |
| OPTIONAL, -- Need M | |
| ssb-perRACH-Occasion | ENUMERATED {oneEighth, oneFourth, oneHalf, |
| one, two, | |
| | four, eight, sixteen} |
| OPTIONAL, -- Need M | |
| ra-ssb-OccasionMaskIndex | INTEGER (0..15) |
| OPTIONAL, -- Need M | |
| recoverySearchSpaceId | SearchSpaceId |
| OPTIONAL, -- Need R | |
| ra-Prioritization | RA-Prioritization |
| OPTIONAL, -- Need R | |
| beamFailureRecoveryTimer | ENUMERATED {ms10, ms20, ms40, ms60, ms80, |
| ms100, ms150, ms200} | OPTIONAL, -- Need M |
| ..., | |
| [[ | |
| msg1-SubcarrierSpacing | SubcarrierSpacing |
| OPTIONAL -- Need M | |
| ]], | |
| } | |
| PRACH-ResourceDedicatedBFR ::= | CHOICE { |
| ssb | BFR-SSB-Resource, |
| csi-RS | BFR-CSIRS-Resource |
| } | |
| BFR-SSB-Resource ::= | SEQUENCE { |
| ssb | SSB-Index, |
| ra-PreambleIndex | INTEGER (0..63), |
| ... | |
| } | |
| BFR-CSIRS-Resource ::= | SEQUENCE { |
| csi-RS | NZP-CSI-RS-ResourceId, |
| ra-OccasionList | SEQUENCE (SIZE(1..maxRA-OccasionsPerCSIRS)) |
| OF INTEGER (0..maxRA-Occasions-1) | OPTIONAL, -- Need R |
| ra-PreambleIndex | INTEGER (0..63) |
| OPTIONAL, -- Need R | |
| ... | |
| } | |
| maxNrofCandidateBeams-r16 | INTEGER ::= 64    -- Max number of |
| candidate beam resources in BFR config. | |

The IE BeamFailureRecoverySCellConfig is used to configure the UE with candidate beams for beam failure recovery in case of beam failure detection in Secondary Cell (SCell). The detailed information on RRC signalling for BeamFailureRecoverySCellConfig is shown as follows.

| BeamFailureRecoverySCellConfig information element |
|---|
| BeamFailureRecoverySCellConfig-r16 ::= SEQUENCE {<br>   rsrp-ThresholdBFR-r16            RSRP-Range<br>OPTIONAL, -- Need M<br>   candidateBeamRSSCellList-r16       SEQUENCE (SIZE(1..maxNrofCandidateBeams-<br>r16)) OF CandidateBeamRS-r16    OPTIONAL, -- Need M<br>   ...<br>}<br>CandidateBeamRS-r16 ::=             SEQUENCE {<br>   candidateBeamConfig-r16         CHOICE {<br>      ssb-r16                  SSB-Index,<br>      csi-RS-r16              NZP-CSI-RS-ResourceId<br>   },<br>   servingCellId               ServCellIndex<br>OPTIONAL -- Need R<br>} |

That is, one candidate beam resource list, candidateBeamRSList or candidateBeamResourceList, is configured in Release 15 or Release 16 for identification of one new beam. A new beam is identified with its associated L1-RSRP larger than the configured threshold.

For SCell beam failure recovery in Release 16, one new identified beam is reported by Media Access Control (MAC) Control Element (CE) with its associated candidate RS ID.

Beam Failure Recovery (BFR) MAC CE consists of either SCell BFR MAC CE or Truncated SCell BFR MAC CE.

The BFR MAC CEs are identified by a MAC subheader with Logical Channel Index (LCID) as specified in TS 38.321.

The BFR MAC CE has a variable size. It includes a bitmap in an ascending order based on the ServCellIndex, and beam failure recovery information, i.e., octets containing candidate beam availability indication (AC) for SCells indicated in the bitmap. A single octet bitmap is used when the highest ServCellIndex of this MAC entity's SCell configured with beam failure detection (BFD) is less than 8, otherwise four octets are used.

Figure 4A:
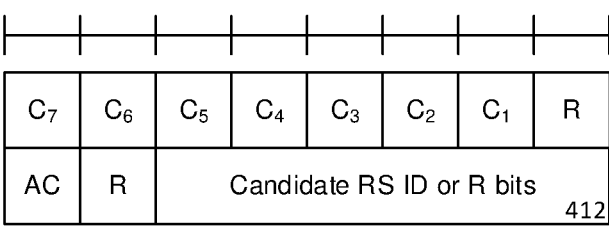
FIG. 4A is a schematic diagram illustrating an example of SCell Beam Failure Recovery (BFR) and Truncated SCell BFR Media Access Control (MAC) Control Element (CE) with the highest ServCellIndex of this MAC entity's SCell configured with BFD less than 8 in accordance with some implementations of the present disclosure.
Figure 4B:
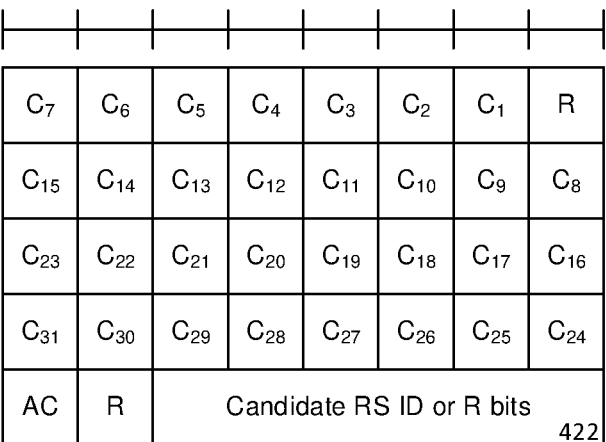
FIG. 4B is a schematic diagram illustrating an example of SCell BFR and Truncated SCell BFR MAC CE with the highest ServCellIndex of this MAC entity's SCell configured with BFD equal to or higher than 8 in accordance with some implementations of the present disclosure.

FIG. 4A shows an example of SCell BFR and Truncated SCell BFR MAC CE with the highest ServCellIndex of this MAC entity's SCell configured with BFD less than 8; and FIG. 4B shows an example of SCell BFR and Truncated SCell BFR MAC CE with the highest ServCellIndex of this MAC entity's SCell configured with BFD equal to or higher than 8.

The fields in the BFR MAC CEs shown in FIGS. 4A and 4B are defined as follows:

$C_i$ (SCell BFR MAC CE): This field indicates beam failure detection and the presence of an octet containing the AC field for the SCell with ServCellIndex i as specified in TS 38.331. If the $C_i$ field set to 1, beam failure is detected and the octet containing the AC field is present for the SCell with ServCellIndex i. If the $C_i$ field set to 0, the beam failure is not detected and octet containing the AC field is not present for the SCell with ServCellIndex i. The octets containing the AC field are present in ascending order based on the ServCellIndex, $C_i$ (Truncated SCell BFR MAC CE): This field indicates beam failure detection for the SCell with ServCellIndex i as specified in TS 38.331. If the $C_i$ field set to 1, beam failure is detected and the octet containing the AC field for the SCell with ServCellIndex i may be present. If the $C_i$ field set to 0, the beam failure is not detected and the octet containing the AC field is not present for the SCell with ServCellIndex i. The octets containing the AC field, if present, are included in ascending order based on the ServCellIndex. The number of octets containing the AC field included is maximized, while not exceeding the available grant size. The number of the octets containing the AC field in the Truncated SCell BFR format can be zero;

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID (412, 414, 422, 424): This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: Reserved bit, set to 0.

For the PCell or the PSCell, a UE can be provided a CORESET through a link to a search space set provided by recoverySearchSpaceId, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for Physical Random Access Channel (PRACH) transmission. For PRACH transmission in slot n and according to antenna port quasi co-location parameters associated with periodic CSI-RS resource configuration or with SS/PBCH block associated with index $q_{new}$ provided by higher layers, the UE monitors PDCCH in a search space set provided by recoverySearchSpaceId for detection of a DCI format with CRC scrambled by Cell Radio Network Temporary Identifier (C-RNTI) or Modulation Coding Scheme C-RNTI (MCS-C-RNTI) starting from slot n+4 within a window configured by BeamFailureRecoveryConfig. For PDCCH monitoring in a search space set provided by recoverySearchSpaceId and for corresponding Physical Downlink Shared Channel (PDSCH) reception, the UE assumes the same antenna port quasi-collocation parameters as the ones associated with index anew until the UE receives by higher layers an activation for a TCI state or any of the parameters tci-StatesPDCCH-ToAddList and/or tci-StatesPDCCH-ToRe-leaseList.

That is, for PDCCH monitoring in a search space set provided by recoverySearchSpaceId, the UE assumes the same antenna port quasi-collocation parameters as the ones associated with index $q_{new}$. The UE monitors PDCCH in a search space set provided by recoverySearchSpaceId for detection of a DCI format with CRC scrambled by C-RNTI or MCS-C-RNTI starting from 4 slot after PRACH transmission slot within a window configured by BeamFailur-eRecoveryConfig.

The Random Access Radio Network Temporary Identifier (RA-RNTI) associated with the PRACH occasion in which the Random Access Preamble is transmitted, is computed as:

$$RA\text{-}RNTI=1+s\_id+14{\times}t\_id+14{\times}80{\times}f\_id+14{\times}80{\times}8{\times} ul\_carrier\_id,$$

where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ specified in TS 38.211, f_id is the index of the PRACH occasion in the frequency domain (0≤f_id<8), and ul_carrier_id is the UL carrier used for Random Access Preamble transmission (0 for Normal Uplink (NUL) carrier, and 1 for Supplementary Uplink (SUL) carrier).

That is, RA-RNTI value is derived based on the first OFDM symbol of the PRACH occasion, the first slot of the PRACH occasion in a system frame, the index of the PRACH occasion in the frequency domain and the UL carrier used for Random Access Preamble transmission.

As mentioned earlier, only one beam is identified during link recovery and used for later PDCCH transmission in Release 15 or Release 16, where PDCCH is only supported with single time transmission with single TCI state. In the disclosure, schemes for multiple new beams identification and multiple PDCCH transmissions with newly identified beams for link recovery are disclosed. In detail, multiple candidate beam lists/sets or combined new beam identification resources are proposed to identify new beams from multiple TRPs. For the PCell or the PSCell, one PRACH resource is configured together with one beam identification resource associated with a candidate beam. Based on the detected PRACH and the linkage relation between multiple identified beams and TCI states for PDCCH transmissions/monitoring, gNB may obtain information on newly identified beams. For the SCell, the gNB may obtain information on newly identified beams with BFR MAC CE.

The newly identified beams are used for later multiple PDCCH transmissions during link recover until later TCI state updating. In some examples, the search space set for link recovery may be a search space set linked with a CORESET with multiple activated TCI states. In some other examples, the search space set for link recovery with multiple identified beams may be a joint search space set where each search space set is used for monitoring PDCCH transmission from one TRP.

The PDCCH monitoring window for RAR starts after 4 slots of the last PRACH transmission slot, where multiple transmitted PRACH are associated with multiple identified beams. When contention based PRACH is used for link recovery, a common RA-RNTI value is used for the second message (Msg-2) PDCCH CRC scrambling to guarantee the same DCI contention for achieving combination gain from multiple time transmission.

Multiple New Beam Identification

For Release 15 or Release 16 new beam identification, only one new beam is targeted where single PDCCH with the newly identified beam is used for PDCCH transmission during link recovery. Thus, only one resource is used for each candidate beam in candidateBeamRSList or candidate-BeamResourceList. In Release 17, PDCCH may be transmitted with multiple times to improve reliability where multiple beams from TRPs may be used for multiple PDCCH transmissions. Multiple new beam identification, reporting of the multiple newly identified beams and PDCCH transmission/monitoring behaviour based on multiple newly identified beams are discussed below for PDCCH with multiple transmissions.

Upon detection of beam failure, the UE monitors the beam identification resources and identifies new beams for link recovery. The identified new beams may be referred to as recovery beams. The recovery beams are selected from the candidate beams. Each of the candidate beams or recovery beams is linked with a candidate RS, and may be represented by a candidate RS ID. Once a recovery beam is identified, the UE transmits information indicating the recovery beam by transmitting an identified candidate RS ID, the gNB would be able to determine a corresponding recovery beam from the candidate RS ID received.

In some examples, separate beam identification is used for new beam for each TRP. Multiple candidate beam lists/sets may be configured for new beam identification, where each candidate beam list/set is used for beam identification for one TRP. In addition, the L1-RSRP threshold for new beam identification for each TRP may be independently configured or share the same value. The repetition number may be further considered as an offset value on top of the derived L1-RSRP threshold for each TRP.

Based on L1-RSRP measurement, the UE chooses two beams with each one from a different configured beam list or set. If the L1-RSRP for a candidate beam is above the threshold, the candidate beam may be selected as a newly identified beam for link recovery, or a recovery beam.

Figure 5A:
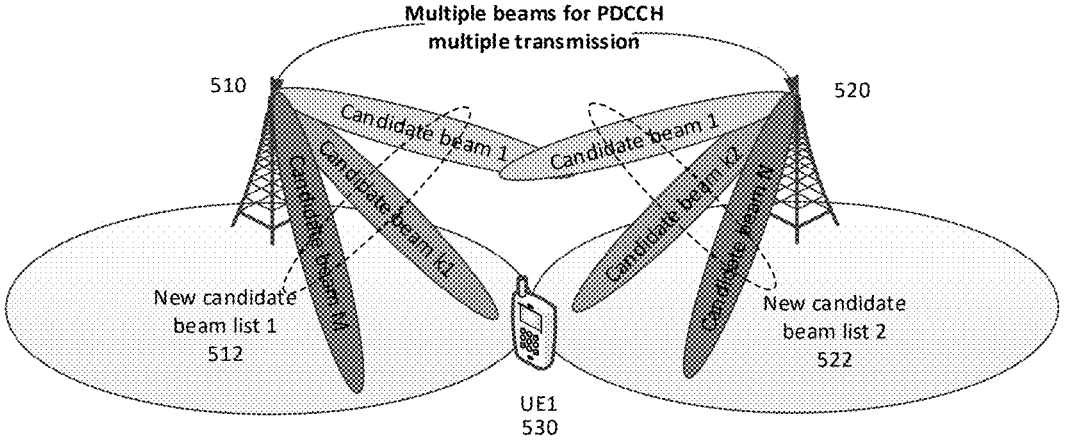
FIG. 5A is a schematic diagram illustrating an example of beam identification with separate candidate beam lists in accordance with some implementations of the present disclosure.

FIG. 5A shows an example of beam identification with separate candidate beam lists, where each list includes multiple beams, for multiple PDCCH transmissions from multiple TRPs 510, 520 to UE 530. For TRP 510, a new candidate beam list 1 512 including candidate beam 1, candidate beam k1 and candidate beam M is configured; for TRP 520, a new candidate beam list 2 522 including candidate beam 1, candidate beam k2 and candidate beam N is configured. Each new beam identified for link recovery, e.g., candidate beam k1 or k2, is selected from new candidate beam lists 1 and 2, respectively. Since the new beams are selected from two separate candidate beam sets or lists, the threshold may be configured independently for each beam set for flexibility in some examples. That is, in the example shown in FIG. 5A, candidate beam k1 from new candidate beam list 1 512 may have a L1-RSRP value above a first threshold and candidate beam k2 from new candidate beam list 2 522 may have a L1-RSRP value above a second threshold, where the first threshold is a threshold value for the new candidate beam list 1 512 and the second threshold is a threshold value for the new candidate beam list 2 522.

In some other examples, the same value may be used as the threshold for two candidate beam sets/lists. That is, in the example shown in FIG. 5A, the new identified beams, candidate beam k1 from new candidate beam list 1 512 and candidate beam k2 from new candidate beam list 2 522, may have L1-RSRP values above the same threshold. For the new beam L1-RSRP measurement, it is related with RS configuration for candidate beams.

In Release 15/16, candidateBeamRSList and candidateBeamRSSCellList-r16 (parameters shown in BeamFailureRecoverySCellConfig and BeamFailureRecoveryConfig IEs) are used for configuring candidate beam lists for PCell and SCell new beam identification, respectively. To support multiple beam identification, optional parameters candidateBeamRSListCombination and candidateBeamRSSCellList-Combination are introduced, where there are maxNrofCandidateBeamRSListPerCombination, or maxNrofCandidateBeamRSSCellListPerCombination (e.g., 2) candidate beam resource lists or sets, and each list or set is used for one new beam identification linked with one TRP. The maximum candidate beam number in one list, i.e., maxNrofCandidateBeams or maxNrofCandidateBeams-r16, remains as 16 or 64, which is the same as that in Release 15/16. In addition, an additional parameter rsrp-ThresholdSSBAdditional may be introduced as a separate threshold for new beam identification for another TRP for flexibility. The detailed information for RRC signalling design is shown in the following RRC IE designs for multiple candidate beam sets/lists for new beam identification, one for PCell/PSCell compatible with Release 15 and one for SCell compatible with Release 16. The newly introduced part is marked in bold.

With this design, separate beam identification resources are configured for each TRP. Identified beams may be reported to gNB by dedicated PRACH resources by RRC parameter PRACH-ResourceDedicatedBFR for link recovery, where each PRACH resource is linked with one candidate beam identification resource as configuration of BFR-SSB-Resource and BFR-CSIRS-Resource defined in Release 15 (configured in BeamFailureRecoveryConfig IE). Thus, separate beam identification for each TRP can be supported. It has small realization complexity.

In some other examples, joint beam identification is used for new beam for multiple TRPs. The UE is configured with a set of candidate beam pairs/combinations, where each pair or each combination consists of two beams transmitted from separate TRPs. If the L1-RSRP for each new candidate beam in the beam combination is above the threshold, the candidate beam pair/combination can be selected as newly identified beams for link recovery. The L1-RSRP threshold(s) for joint new beam identification for multiple TRPs may be configured; and the repetition number may also be considered as an offset value on top of the derived joint L1-RSRP threshold(s).

Figure 5B:
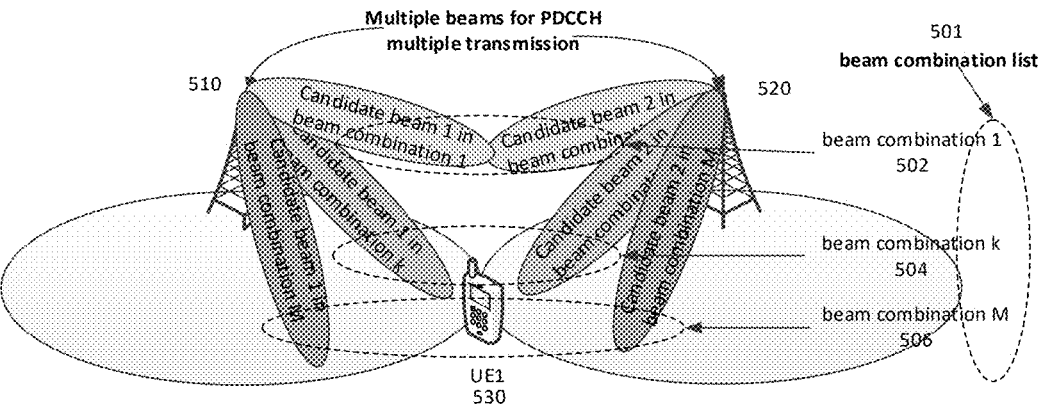
FIG. 5B is a schematic diagram illustrating an example of beam identification with a list of candidate beam combinations in accordance with some implementations of the present disclosure.

FIG. 5B shows an example of beam identification with a list of candidate beam combinations, with each combination including multiple beams, for multiple PDCCH transmissions from multiple TRPs 510, 520 to UE 530. A candidate beam combination list 501 including beam combination 1

---

RRC IE Design for multiple candidate beam sets/lists for PCell/PSCell new beam identification

```
BeamFailureRecoveryConfig ::=          SEQUENCE {
    ...
    rsrp-ThresholdSSB                  RSRP-Range             OPTIONAL, -- Need M
    rsrp-ThresholdSSBAdditional        RSRP-Range             OPTIONAL, -- Need M
    candidateBeamRSListCombination                  SEQUENCE
(SIZE(1..maxNrofCandidateBeamRSListPerCombination)) OF candidateBeamRSList
OPTIONAL, -- Need M
}
candidateBeamRSList                    SEQUENCE (SIZE(1..maxNrofCandidateBeams)) OF
PRACH-ResourceDedicatedBFR                                    OPTIONAL, -- Need
M
candidateBeamRSListExt-r16             SEQUENCE (SIZE(0..maxNrofCandidateBeamsExt-r16))
OF PRACH-ResourceDedicatedBFR                                OPTIONAL --
Need
PRACH-ResourceDedicatedBFR ::=         CHOICE {
    ssb                                BFR-SSB-Resource,
    csi-RS                             BFR-CSIRS-Resource
}
    ...
}
maxNrofCandidateBeamRSListPerCombination  INTEGER  ::=  2
maxNrofCandidateBeams INTEGER ::= 16
BeamFailureRecoverySCellConfig-r16 ::=  SEQUENCE {
    rsrp-ThresholdBFR-r16              RSRP-Range             OPTIONAL, --
Need M
    candidateBeamRSSCellListCombination                 SEQUENCE
(SIZE(1..maxNrofCandidateBeamRSSCellListPerCombination)) OF
candidateBeamRSSCellList-r16
    OPTIONAL, -- Need M
    candidateBeamRSSCellList-r16               SEQUENCE (SIZE(1..maxNrofCandidateBeams-
r16)) OF CandidateBeamRS-r16     OPTIONAL, -- Need M
    ...
}
CandidateBeamRS-r16 ::=                SEQUENCE {
    candidateBeamConfig-r16            CHOICE {
        ssb-r16                        SSB-Index,
        csi-RS-r16                     NZP-CSI-RS-ResourceId
    },
    servingCellId                      ServCellIndex          OPTIONAL --
Need R
}
maxNrofCandidateBeamRSSCellListPerCombination  INTEGER  ::=  2
maxNrofCandidateBeams-r16 INTEGER ::= 64
```

502, beam combination k 504 and beam combination M 506 is configured. For each beam combination or each beam pair, it is composed of two candidate beams, each from one TRP. For example, beam combination 1 502 includes candidate beam 1 from TRP 510 and candidate beam 2 from TRP 520. A candidate beam combination, e.g., beam combination k 504, is selected from the beam combination list 501 if the L1-RSRP for each candidate beam in the beam combination k 504 is above the threshold. The candidate beams 1 and 2 in the beam combination k 504 are selected as newly identified beams for link recovery. Since the new beams are jointly selected from one candidate beam combination set/list, one common joint threshold may be used. Alternatively, two thresholds may be used for identifying beams in the candidate beam combination, respectively. For the new beam L1-RSRP measurement, it is related with RS configuration for candidate beams.

The detailed information for RRC signalling design is shown in the following RRC IE designs for candidate beam identification resource combination for new beam identification, one for PCell/PSCell compatible with Release 15 and one for SCell compatible with Release 16. The newly introduced part is marked in bold.

name for PCell/PSCell and SCell) candidate beam resource combinations, i.e. PRACH-ResourceCombinationDedicatedBFR or CandidateBeamRSCombination in the list. The values of maxNrofCandidateBeamCombinations may remain 16 or 64, respectively, as the value defined for the new beam identification resource list. For PRACH-ResourceCombinationDedicatedBFR, it composes of the number of maxNrofResourceDedicatedBFRPerCombination, e.g. 2, beam identification resources defined by PRACH-ResourceDedicatedBFR, where each beam identification resource is used for new beam identification for one TRP. With the same principle, for CandidateBeamRSCombinations for SCell new beam identification, it composes of number of maxNrofCandidateBeamsPerCombination, e.g. 2, beam identification resources configured by CandidateBeamRS-r16, where each beam identification resource is used for new beam identification for one TRP. Identified beams may be reported to gNB by dedicated PRACH resources by RRC parameter PRACH-ResourceDedicatedBFR for link recovery, where each PRACH resource is linked with one candidate beam identification resource as configuration of BFR-SSB-Resource and BFR-CSIRS-Resource defined in Release 15 and each PRACH resource, i.e. PRACH-ResourceDedicatedBFR, is defined by newly intro- RRC IE Design for candidate beam identification resource combination for PCell/PSCell new beam identification

```
BeamFailureRecoveryConfig ::=                    SEQUENCE {
    ...
    rsrp-ThresholdSSB                            RSRP-Range                     OPTIONAL, -- Need M
    candidateBeamRSCombinationList               SEQUENCE
(SIZE(1..maxNrofCandidateBeamCombinations)) OF PRACH-ResourceCombinationDedicatedBFR
OPTIONAL, -- Need M
    PRACH-ResourceCombinationDedicatedBFR SEQUENCE (SIZE
(1..maxNrofResourceDedicatedBFRPerCombination)) OF PRACH-ResourceDedicatedBFR
OPTIONAL, -- Need M
}
PRACH-ResourceDedicatedBFR ::=                   CHOICE {
    ssb                                          BFR-SSB-Resource,
    csi-RS                                       BFR-CSIRS-Resource
}
    ...
}
maxNrofCandidateBeamCombinations                    INTEGER ::= 16          -- Max number
of candidate beam resource combinations in BFR config.
maxNrofResourceDedicatedBFRPerCombination    INTEGER  ::=  2
BeamFailureRecoverySCellConfig-r16 ::=           SEQUENCE {
    rsrp-ThresholdBFR-r16                        RSRP-Range                     OPTIONAL, --
Need M
    candidateBeamRSCombinationSCellList                    SEQUENCE
(SIZE(1..maxNrofCandidateBeamCombinations)) OF CandidateBeamRSCombination
OPTIONAL, -- Need M
    CandidateBeamRSCombinations                  SEQUENCE
(SIZE(1..maxNrofCandidateBeamsPerCombination)) OF CandidateBeamRS-r16
OPTIONAL, -- Need M
    ...
}
CandidateBeamRS-r16 ::=                          SEQUENCE {
    candidateBeamConfig-r16                      CHOICE {
        ssb-r16                                  SSB-Index,
        csi-RS-r16                               NZP-CSI-RS-ResourceId
    },
    servingCellId                                ServCellIndex                  OPTIONAL --
Need R
}
maxNrofCandidateBeamCombinations  INTEGER  ::=  64
maxNrofCandidateBeamsPerCombination  INTEGER  ::=  2
```

To support multiple beam identification, optional parameters candidateBeamRSCombinationList and candidateBeamRSCombinationSCellList are introduced, where there are maxNrofCandidateBeamCombinations (same parameter duced joint PRACH resource configuration, i.e. PRACH-Resource CombinationDedicatedBFR.

With this design, the beam identification resources are jointly configured for multiple TRPs. Thus, joint multiple beam identification can be supported. It can identify new beams with high channel quality.

In Release 16, SCell beam failure is introduced. When SCell beam failure recovery request (BFRQ) is triggered, two steps are made, where the first step is carried by a dedicatedly configured SR-like (Scheduling Request-like) Physical Uplink Control Channel (PUCCH) in PCell or PSCell to inform gNB that beam failure happens and the second step is carried by a MAC CE to report detailed information including failed Component Carrier (CC) index and new beam index. For the new beam identification schemes proposed in the disclosure, two new identified beam indices for each failed CC are required to be carried by the MAC CE. This may be realized with extension of MAC CE defined in Release 16.

FIG. 6A shows an example of MAC CE enhancement with additional candidate RS IDs for new beams in the additional RS list; and FIG. 6B shows an example of MAC CE enhancement with candidate RS combination IDs for candidate beam combinations. In the example shown in FIG. 6A, additional candidate RS IDs (e.g., 612b, 614b) are used for reporting newly identified beams (i.e., recovery beams) from the additional candidate RS list (i.e., RS list 2), in addition to candidate RS IDs 612a, 614a in RS list 1. The MAC CE may be used for new identified beam reporting with separate beam identification, where indices of two new identified beams, each from one TRP (corresponding to two candidate RS IDs, each from one RS list), are reported to the gNB.

In the example shown in FIG. 6B, candidate RS combination IDs (e.g., 622, 624) are used for reporting newly identified beam combination, where a candidate beam combination corresponding to a candidate RS combination ID includes multiple identified beams with one beam for one TRP. The MAC CE may be used for new identified beams reporting with joint beam identification. Though the examples illustrated here are MAC CE with the highest ServCellIndex of the MAC entity's SCell configured with BFD less than 8, it can be easily extended to the cases with the highest ServCellIndex of the MAC entity's SCell configured with BFD equal to or larger than 8 using the same principle.

The first recovery beam (i.e., new identified beam) may be linked with the first candidate RS ID or the first candidate RS of the combination ID. The second recovery beam may be linked with the second candidate RS ID or the second candidate RS of the combination ID.

In some cases, there may be no L1-RSRP measured above the threshold based on candidate new beam identification RSs. In this case, no new beam is identified as recovery beams. In some cases, there may be only one L1-RSRP from one TRP measured above the threshold based on candidate new beam identification RSs. If this happens, only one new beam may be selected and reported to the gNB. That is, a single recovery beam may be identified for link recovery; and PRACH may be transmitted on one of the PRACH resources associated with the selected candidate RS ID corresponding to the single recovery beam.

In case of only a single recovery beam is identified for link recovery, the BFR MAC CE may include only one list including a candidate RS ID corresponding to the recovery beam, and the second list may include only Reserved bits (R bits). Alternatively, the BFR MAC CE may include a candidate RS combination ID and a selecting bit indicating selection of one recovery beam from the combination indicated by the candidate RS combination ID.

PDCCH Transmission with New Identified Beams During Link Recovery

Since PDCCH reliability is improved by multiple transmissions, it is reasonable to use identified multiple beams for later PDCCH transmission, e.g., PDCCH for scheduling response for beam failure recovery request, during link recovery. For PDCCH monitoring, a UE is required to be provided a special search space set provided by recovery-SearchSpaceId. One identified beam may be denoted by, or associated with, one identified candidate RS.

In some examples, the search space set for link recovery may be a search space set linked with a CORESET with multiple activated TCI states. Here, one identified beam is implicitly linked with one activated TCI and used for PDCCH transmission/monitoring. TCI states for monitoring of multiple transmissions of PDCCH may be determined based on a linkage relation between the new identified beams and associated TCI states.

FIG. 7A shows an example illustrating a linkage relation between identified new beams and TCI state for each PDCCH transmission in case of single CORESET with multiple activated TCI states. One DCI is transmitted with multiple times of repeat transmission from multiple TRPs 710, 720 to UE 730 with each repeat transmission monitored on one PDCCH monitoring occasion. One CORESET (CORESET 0) is configured for PDCCH transmission, and multiple times of DCI repetition are transmitted in multiple monitoring occasions in one search space set (search space k) with different activated TCI states (i.e., activated TCI state 1 and activated TCI state 2). In some examples, the identified new beams from the first and second beam identification resource sets/lists are used as the first and second activated TCI states for PDCCH transmission/monitoring, respectively. Referring to the example shown in FIG. 7A, during link recovery, the newly identified beam 1 702 or newly identified beam 2 704 is used for PDCCH transmission with activated TCI state 1 or activated TCI state 2 for CORESET 0 by implicitly defined linkage, where newly identified beams are selected separately from the first and second new beam identification resource sets/lists, respectively. In some examples, the identified new beams from the first and second beam identification resources of a beam identification resource combination (i.e., a candidate beam combination) are used as the first and second activated TCI states for PDCCH transmission/monitoring, respectively. Referring to the example shown in FIG. 7A, during link recovery, the newly identified beam 1 702 or newly identified beam 2 704 is used for PDCCH transmission with activated TCI state 1 or activated TCI state 2 for CORESET 0 by implicitly defined linkage, where newly identified beams are selected jointly from the beam identification resource combination set/list.

In some other examples, the search space set for link recovery may be a joint search space set, where each component search space set is linked with one CORESET with one activated TCI state. One identified beam is implicitly linked with one CORESET and used for PDCCH transmission/monitoring.

FIG. 7B shows an example illustrating a linkage relation between identified new beams and TCI state for each PDCCH transmission in case of multiple CORESETs with one activate TCI state for one CORESET. One DCI is transmitted with multiple times of repeat transmission from multiple TRPs 710, 720 to UE 730 with each repeat transmission monitored on one PDCCH monitoring occasion. Multiple CORESETs (CORESET 0, CORESET 1) are configured for PDCCH transmission, and multiple times of DCI repetition are transmitted in multiple monitoring occasions in multiple search space sets (search space k and search space k+1). In some examples, the identified new beams from the first and second beam identification resource sets/lists are used for PDCCH transmission/monitoring from the first and second CORESETs, respectively. Referring to the example shown in FIG. 7B, during link recovery, the newly identified beam 1 702 or newly identified beam 2 704 is used for PDCCH transmission with activated TCI state for CORESET 0 or CORESET 1 by implicitly defined linkage, where newly identified beams are selected separately from the first and second new beam identification resource sets/lists, respectively. In some examples, the identified new beams from the first and second beam identification resources of a beam identification resource combination (i.e., a candidate beam combination) are used for PDCCH transmission/monitoring from the first and second CORE-SETs, respectively. Referring to the example shown in FIG. 7B, during link recovery, the newly identified beam 1 702 or newly identified beam 2 704 is used for PDCCH transmission with activated TCI state for CORESET 0 or CORESET 1 by implicitly defined linkage, where newly identified beams are selected jointly from the beam identification resource combination set/list.

In Release 15, PDCCH monitoring window starts after 4 slots of PRACH transmission slot, where PRACH is transmitted according to antenna port quasi co-location parameters associated with periodic CSI-RS resource configuration or with SS/PBCH block associated with index anew provided by higher layers. When multiple new beams are identified, there may be multiple PRACH transmissions according to configuration of PRACH-ResourceDedicatedBFR, which are associated with multiple identified beams and may be transmitted in different occasions. Thus, the PRACH transmission slot should be clarified for determining the starting slot of PDCCH monitoring window for RAR. Since the gNB makes PDCCH resource allocation and transmission after it receives multiple PRACH linked with the newly identified beams and gets the corresponding TCI information, the starting slot of PDCCH monitoring may be defined as after 4 slots relative to the last PRACH transmission slot among multiple PRACH transmission slots with the newly identified beams.

That is, the PDCCH monitoring window starts after 4 slots relative to the last PRACH transmission slot among the multiple PRACH transmission slots with identified beams.

In Release 15, both contention based and contention free PRACH can be used for beam failure recovery. For contention based PRACH transmission, RA-RNTI is determined by index of the first OFDM symbol of the PRACH occasion, index of the first slot of the PRACH occasion in a system frame, index of the PRACH occasion in the frequency domain and UL carrier used for Random Access Preamble transmission. When multiple PRACH resources are used for new beam identification, different RA-RNTI values may be derived based on different PRACH resources. To achieve PDCCH combination gain from multiple transmissions, it is preferred to use same source bits for PDCCH with multiple transmissions. Thus, a same RA-RNTI value for the PRACH resources is required on account of CRC bits scrambled by RA-RNTI. To get a common RA-RNTI value for multiple PDCCH transmissions, one predefined PRACH resource among the PRACH resources may be used for deriving the RA-RNTI. For example, the PRACH resource for deriving the RA-RNTI may be the first or last transmitted PRACH resource for new beam identification.

FIG. 8 is a flow chart illustrating steps of new beam identification for link recovery for enhanced PDCCH with multiple transmissions by UE in accordance with some implementations of the present disclosure.

At step 802, the receiver 214 of UE 200 receives configurations indicating a plurality of beam identification resources for identifying a plurality of candidate beams for link recovery.

At step 804, the processor 202 of UE 200 controls the receiver to monitor the beam identification resources.

At step 806, the processor 202 of UE 200 identifies one or more recovery beams from the candidate beams, upon detection of beam failure.

At step 808, the transmitter 212 of UE 200 transmits information indicating the recovery beams.

At step 810, the processor 202 of UE 200 controls the receiver to monitor Physical Downlink Control Channel (PDCCH) transmitted with the recovery beams.

FIG. 9 is a flow chart illustrating steps of new beam identification for link recovery for enhanced PDCCH with multiple transmissions by NE in accordance with some implementations of the present disclosure.

At step 902, the transmitter 312 of NE 300 transmits configurations indicating a plurality of beam identification resources for identifying a plurality of candidate beams for link recovery.

At step 904, the transmitter 312 of NE 300 transmits Reference Signals (RS) on the beam identification resources.

At step 906, the receiver 314 of NE 300 receives information indicating one or more recovery beams identified from the candidate beams for link recovery.

At step 908, the transmitter 312 of NE 300 transmits Physical Downlink Control Channel (PDCCH) with the recovery beams.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
receive configurations indicating a plurality of beam identification resources for identifying a plurality of candidate beams for link recovery;
monitor the plurality of beam identification resources and identify one or more recovery beams from the candidate beams, upon detection of beam failure;
transmit information indicating the recovery beams; and
monitor Physical Downlink Control Channel (PDCCH) transmitted with the recovery beams.

2. The UE of claim 1, wherein the configurations further indicates Physical Random Access Channel (PRACH) resources associated with the candidate beams, and the information indicating the recovery beams is transmitted on PRACH resources associated with the recovery beams.

3. The UE of claim 2, wherein the at least one processor is configured to cause the UE to identify a single recovery beam for link recovery; and the information is transmitted on one of the PRACH resources corresponding to the single recovery beam, and indicates the single recovery beam.

4. The UE of claim 1, wherein the information indicating the recovery beams is transmitted with a Beam Failure Recovery (BFR) Media Access Control (MAC) Control Element (CE), and the BFR MAC CE comprises: a plurality of lists of candidate Reference Signal (RS) Indices (IDs), wherein each one of the candidate RS IDs corresponds to one of the recovery beams, or a candidate RS combination ID indicating a combination of the recovery beams.

5. The UE of claim 4, wherein the at least one processor is configured to cause the UE to identify a single recovery beam for link recovery; and the BFR MAC CE comprises: a first list including a candidate RS ID corresponding to the recovery beam and a second list including Reserved bits (R bits) as candidate RS ID, or a selecting bit indicating selection of one recovery beam from the combination indicated by the candidate RS combination ID.

6. The UE of claim 1, wherein the configurations comprise a plurality of beam identification resource sets, each set comprising beam identification resources from one transmitting-receiving identity.

7. The UE of claim 1, wherein the configurations comprise a plurality of beam identification resource combinations, each combination comprising a first beam identification resource from a first transmitting-receiving identity and a second beam identification resource from a second transmitting-receiving identity.

8. The UE of claim 1, wherein the recovery beams are selected from the candidate beams having Layer 1 Reference Signal Received Power (L1-RSRP) above a common threshold.

9. The UE of claim 1, wherein the recovery beams comprise a first recovery beam selected from a first subset of the candidate beams having L1-RSRP above a first threshold, and a second recovery beam selected from a second subset of the candidate beams having L1-RSRP above a second threshold.

10. The UE of claim 1, wherein the at least one processor is configured to cause the UE to determine a plurality of Transmission Configuration Indication (TCI) states for monitoring of multiple transmissions of PDCCH based on a linkage relation between the recovery beams and associated TCI states.

11. The UE of claim 1, wherein the at least one processor is configured to cause the UE to determine a joint search space set with each component search space set linked with a Control Resource Set (CORESET) for monitoring of multiple transmissions of PDCCH based on a linkage relation between the recovery beams and associated CORESETs each having one activated TCI state.

12. The UE of claim 1, wherein the at least one processor is configured to cause the UE to determine a search space set linked with a CORESET with a plurality of activated TCI states for monitoring of multiple transmissions of PDCCH, based on a linkage relation between the recovery beams and the activated TCI states.

13. The UE of claim 2, wherein the at least one processor is configured to cause the UE to transmit PRACH with the recovery beams over a plurality of PRACH transmission slots; and determine a PDCCH monitoring window that starts after 4 slots relative to a last PRACH transmission slot among the PRACH transmission slots.

14. The UE of claim 2, wherein the at least one processor is configured to cause the UE to derive a common Random Access Radio Network Temporary Identifier (RA-RNTI) value using a first or last transmitted PRACH for a beam failure recovery request.

15. A base station, comprising:

at least one memory; and at least one processor coupled with the at least one memory and configured to cause the base station to:

transmit configurations indicating a plurality of beam identification resources for identifying a plurality of candidate beams for link recovery, and transmit Reference Signals (RS) on the plurality of beam identification resources;

receive information indicating one or more recovery beams identified from the candidate beams for link recovery; and transmit Physical Downlink Control Channel (PDCCH) with the recovery beams.

16. The base station of claim 15, wherein the configurations indicate Physical Random Access Channel (PRACH) resources associated with the candidate beams, and the information indicates the recovery beams is transmitted on PRACH resources associated with the recovery beams.

17. The base station of claim 16, wherein a single recovery beam is identified for link recovery; and the information is transmitted on one of the PRACH resources corresponding to the single recovery beam, and indicates the single recovery beam.

18. The base station of claim 15, wherein the information indicating the recovery beams is transmitted with a Beam Failure Recovery (BFR) Media Access Control (MAC) Control Element (CE), and the BFR MAC CE comprises: a plurality of lists of candidate Reference Signal (RS) Indices (IDs), wherein each one of the candidate RS IDs corresponds to one of the recovery beams, or a candidate RS combination ID indicating a combination of the recovery beams.

19. The base station of claim 18, wherein a single recovery beam is identified for link recovery; and the BFR MAC CE comprises: a first list including a candidate RS ID corresponding to the recovery beam and a second list including Reserved bits (R bits) as candidate RS ID, or a selecting bit indicating selection of one recovery beam from the combination indicated by the candidate RS combination ID.

20. A method performed by a user equipment (UE), the method comprising:

receiving configurations indicating a plurality of beam identification resources for identifying a plurality of candidate beams for link recovery;

monitoring the plurality of beam identification resources;

identifying one or more recovery beams from the candidate beams, upon detection of beam failure;

transmitting information indicating the recovery beams; and monitoring Physical Downlink Control Channel (PDCCH) transmitted with the recovery beams.

* * * * *